United States Patent
Johnson et al.

(10) Patent No.: US 11,745,141 B2
(45) Date of Patent: Sep. 5, 2023

(54) PHOTOELECTROCHEMICAL DEVICE FOR THE CAPTURE, CONCENTRATION AND COLLECTION OF ATMOSPHERIC CARBON DIOXIDE

(71) Applicant: TOYOTA JIDOSHA KABUSHIKI KAISHA, Toyota (JP)

(72) Inventors: Hannah Johnson, Brussels (BE); Sachin Kinge, Brussels (BE); Michail Tsampas, Nuenen (NL); Georgios Zafeiropoulos, Eindhoven (NL)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/710,025

(22) Filed: Mar. 31, 2022

(65) Prior Publication Data
US 2022/0323900 A1   Oct. 13, 2022

(30) Foreign Application Priority Data
Apr. 7, 2021   (EP) .................................. 21167103

(51) Int. Cl.
*B01D 53/22*   (2006.01)
*B01D 53/32*   (2006.01)
*B01D 53/62*   (2006.01)

(52) U.S. Cl.
CPC ........... *B01D 53/326* (2013.01); *B01D 53/22* (2013.01); *B01D 53/229* (2013.01); *B01D 53/62* (2013.01);
(Continued)

(58) Field of Classification Search
CPC .... B01D 53/326; B01D 53/22; B01D 53/229; B01D 53/62; B01D 2253/206;
(Continued)

(56) References Cited

U.S. PATENT DOCUMENTS 3,519,488 A * 7/1970 Giner .................. H01M 8/0662
429/410
3,692,649 A * 9/1972 Prigent et al. ............ C25B 1/02
205/633
(Continued)

FOREIGN PATENT DOCUMENTS

| CA | 3 179 216 A1 * | 11/2021 | ............ B01D 53/32 |
| EP | 3 234 224 B1 | 6/2018 | |
| WO | 2019136374 A1 | 7/2019 | |

*Primary Examiner* — Timothy C Vanoy
(74) *Attorney, Agent, or Firm* — Oliff PLC

(57) ABSTRACT

The present disclosure relates to a carbon dioxide capture device comprising a first reactor and a second reactor both of which show a (photo)anode containing or connected to oxygen evolution and/or carbon dioxide evolution catalyst(s) and a (photo)cathode containing or connected to an oxygen reduction catalyst, wherein the first reactor comprises an anion exchange membrane placed between the porous (photo)anode and porous (photo)cathode, and the second reactor comprises a proton exchange membrane placed between the porous (photo)anode and porous (photo) cathode. On the porous (photo)cathode side of the first reactor there is a fluid inlet able to carry carbon dioxide, air and water, and on the side of the porous (photo)cathode of the second reactor there is a fluid outlet able to carry carbon dioxide and water.

11 Claims, 8 Drawing Sheets

(52) U.S. Cl.
CPC .. *B01D 2253/206* (2013.01); *B01D 2257/504* (2013.01); *B01D 2259/4558* (2013.01)

(58) Field of Classification Search
CPC ...... B01D 2257/504; B01D 2259/4558; B01D 2258/0283; B01D 2258/06; B01J 2219/0807; B01J 2219/0813
See application file for complete search history.

(56) References Cited

U.S. PATENT DOCUMENTS

| | | | |
|---|---|---|---|
| 7,993,432 | B2 | 8/2011 | Wright et al. |
| 8,791,354 | B2 | 7/2014 | Iwasaki |
| 9,528,192 | B1 | 12/2016 | Chen |
| 10,150,112 | B2 | 12/2018 | Wright et al. |
| 11,466,374 | B1 * | 10/2022 | Collier ................... C25B 11/03 |
| 2010/0230293 | A1 * | 9/2010 | Gilliam ................ B01D 61/422 |
| | | | 205/555 |
| 2012/0220019 | A1 | 8/2012 | Lackner |
| 2015/0165373 | A1 | 6/2015 | Lackner |

\* cited by examiner

111 (Photo)Cathode: ORR  112 Anion  113 Photoanode: OER / CO₂ER
Cathode reactions:  Exchange  Anode reactions:
• ½ O₂ + H₂O + 2 e⁻ → 2 OH⁻  Membrane  • hν + photoanode → h⁺ + e⁻
• 2 CO₂ + 2 OH⁻ → 2 HCO₃⁻   • 2HCO₃⁻ + 2 h⁺ → 2CO₂ + H₂O + ½ O₂

PHOTOELECTROCHEMICAL DEVICE FOR THE CAPTURE, CONCENTRATION AND COLLECTION OF ATMOSPHERIC CARBON DIOXIDE

CROSS-REFERENCE TO RELATED APPLICATION

This application claims priority to European Patent Application No. 21167105.7 filed on Apr. 7, 2020, incorporated herein by reference in its entirety.

TECHNICAL FIELD

The present disclosure relates to a carbon dioxide capture device comprising a first reactor and a second reactor both of which show a (photo)anode containing or connected to oxygen evolution and/or carbon dioxide evolution catalyst(s) and a (photo)cathode containing or connected to an oxygen reduction catalyst, wherein the first reactor comprises an anion exchange membrane placed between the porous (photo)anode and porous (photo)cathode, and the second reactor comprises a proton exchange membrane placed between the porous (photo)anode and porous (photo) cathode. On the porous (photo)cathode side of the first reactor there is a fluid inlet able to carry carbon dioxide, air and water, and on the side of the porous (photo)cathode of the second reactor there is a fluid outlet able to carry carbon dioxide and water, the device being configured to transfer fluid exiting on the side of the porous (photo)cathode of the first reactor to the side of the porous (photo)anode of the second reactor, and to transfer fluid exiting on the side of the porous (photo)anode of the first reactor to the side of the porous (photo)cathode of the second reactor.

In preferred embodiments of the present disclosure, the fluid involved in fluid inlet flow is gaseous, i.e. water and carbon dioxide as well as oxygen are captured from ambient air.

BACKGROUND ART

Anthropogenic carbon dioxide emissions are causing a global environmental crisis, exemplified by increased propensity for natural disasters (such as flooding and droughts), massive ice melt causing a rise in average sea level and mass extinction of animals and plants which cannot evolve quickly enough to survive the new climatic conditions.

Carbon dioxide levels are hoped to decline in the coming years with the introduction of renewable power sources and improved energy efficiency. However, this alone is insufficient to tackle the climate crisis. Indeed a recent report from the International Panel on Climate Change has shown that carbon capture and storage—the capture of emitted carbon dioxide and its long-term storage, for example underground—will play an important role in limiting the extent of global warming. Specifically, it would be necessary to capture and store 14% of carbon dioxide emissions by 2050 in the 2° C. scenario and 32% in the below 2° C. scenario.

Whilst solutions to capture concentrated carbon dioxide are well-known and already commercialized on a medium scale, less is being done to tackle carbon dioxide emitted from unavoidable and non-concentrated sources, such as transport (currently), in-built carbon dioxide emissions in manufacturing, which may need to be offset, and agriculture. The capture of non-concentrated carbon dioxide is known as direct air capture.

In the prior art, electrochemical direct air capture is disclosed in WO 2019/136374 A1. Here, proton-coupled redox active species are used, e.g., a quinone, phenazine, alloxazine, isoalloxazine, or polyoxometalate, whose protonation and deprotonation can be controlled electrochemically to modify the pH of an aqueous solution or aqueous suspension. This change in pH can be used to sequester and release $CO_2$. Alternatively oxidation and reduction cycles of amines, quinones and other ionic liquids can be exploited. The $CO_2$ can be selectively bound and detached depending on the oxidation state of the molecule, allowing the controlled capture and then release of the gas at a collection portal.

Photoelectrochemical carbon dioxide capture is disclosed in U.S. Pat. No. 8,791,354 B2. A redox mediator is used to transfer the $CO_2$ from one side of the device to the other through a liquid electrolyte (nonaqueous solvent or an ionic liquid). Rather than taking the electricity to transfer the $CO_2$ from an external source, light is used to generate charge within a semiconductor (although an external source could also be used, in the night for example). This charge can then be used to push the $CO_2$ through the device. Additionally this device can be used as a photovoltaic cell when the $CO_2$ suppression is by-passed.

Apart from amine cycling and (photo) electrochemical direct air capture of carbon dioxide as mentioned above, a membrane matrix approach is known as disclosed in U.S. Pat. No. 7 993 432 B2, US 2015/0165373 A1, US 2012/0220019 A1 and U.S. Pat. No. 10,150,112 B2. A $CO_2$ sorbent is exposed to a gas mixture and allowed to sorb $CO_2$. Then this gas is released from the sorbent through a regeneration procedure to create a gas-enriched mixture, the $CO_2$ gas-enriched mixture is then put in contact with aqueous solution, which selectively absorbs $CO_2$. The sorbent material could be a solid phase anion exchange membrane with relatively large surface area (air flow with minimum resistance)—open matrix or coated on a support material, such as a cellulose matrix.

As regards $CO_2$ capture devices, the current solutions are i. energy intensive, ii. high cost and iii. provide little financial incentive for installation (beyond avoiding future carbon taxes, the future cost of which is still undecided).

It is desirable to offer generation of electricity in parallel to the $CO_2$ capture, incentivizing the concept compared with the electrochemical, membrane matrix and amine cycling approaches. It is preferable to propose a solid state device—simplifying installation and operation, and avoid the use of exotic chemical species such as redox mediators which are expensive and difficult to scale.

SUMMARY

The disclosure described herein is a device for solar-driven direct air carbon dioxide capture and separation. It utilises an anion exchange membrane to selectively trap carbon dioxide in a first reactor of the device which is transferred, preferably using a bias free current, to a storage area on the other side of the first reactor of the device. A second reactor of the device then converts the oxygen to water through a proton exchange membrane for facile separation from carbon dioxide. In addition, electrical power is also provided by the device in parallel with carbon dioxide capture. It can be thought of as a photovoltaic with carbon dioxide capture functionality. The device of the present disclosure can be used to capture $CO_2$ from ambient air or from point (concentrated) sources. Capturing $CO_2$ from ambient air is preferable since the solar energy that can be generated per unit area may limit the $CO_2$ transfer from one side of the membrane to the other when the concentration is too high.

The present disclosure thus describes a photoelectrochemical, solid-state device for the capture and concentration of $CO_2$ through oxidation and reduction cycles of oxygen via an anion exchange membrane. This concentrated gas stream then enters a second photoelectrochemical cell (reactor) which acts a $CO_2$ purifier by removing unwanted oxygen.

In this context, the present disclosure thus provides a carbon dioxide capture device comprising:

(A) a first reactor comprising an anion exchange membrane placed between a porous (photo)anode and porous (photo)cathode, wherein the (photo)anode contains or is connected physically or electrically to oxygen evolution and/or carbon dioxide evolution catalyst(s), and the (photo)cathode contains or is connected physically or electrically to an oxygen reduction catalyst;

(B) a second reactor comprising a proton exchange membrane placed between a porous (photo)anode and porous (photo)cathode, wherein the (photo)anode contains or is connected physically or electrically to an oxygen evolution catalyst, and the (photo)cathode contains or is connected physically or electrically to an oxygen reduction catalyst;

wherein the porous (photo)cathode of the first reactor has at least a fluid inlet able to carry carbon dioxide, air and water, and the porous (photo)anode of the first reactor has at least a fluid inlet able to carry water and oxygen, the porous (photo)cathode of the second reactor has at least a fluid outlet able to carry carbon dioxide and water, and the porous (photo)anode of the second reactor has at least a fluid outlet able to carry water and oxygen, wherein the carbon dioxide capture device is configured to transfer fluid exiting the porous (photo)cathode of the first reactor to the porous (photo)anode of the second reactor, and to transfer fluid exiting the porous (photo)anode of the first reactor to the porous (photo)cathode of the second reactor.

In one preferred embodiment, the anodes of the first and second reactors are both photoanodes. However, the light absorber may, instead of being on the anode side, as photoanode(s), be on the cathode side, in an anode-with-photocathode combination for both first and second reactors. Alternatively, a combination of photoanode and photocathode could be used. At least one light absorber should be present for both first and second reactors. Thus, cathode-anode combinations where neither is a light absorber are not appropriate but other combinations are possible such as photoanode-cathode, anode-photocathode, and photoanode-photocathode.

In the device of the present disclosure, in its various embodiments, all of the inlets can be inlets for liquids or gases. In preferred embodiments, incoming water is from the ambient air (humidity), and inlets appropriate for gas transport are preferred. Appropriate outlets for the device of the present disclosure are also in particular ones appropriate for gas transport.

The (photo)electrodes used in the present disclosure, as porous (photo)cathode or porous (photo)anode of the first or second reactor, are advantageously deposited or grown on, or supported by, a porous electrically conductive support material. In the practice of the present disclosure, it is the porous conducting supports that in particular provide a porous character to the (photo)cathode or porous (photo)anode constructs rather than the (photo)cathode or porous (photo)anode materials themselves. Appropriate (photo)electrode support materials for the porous (photo)cathode or porous (photo)anode of the first and/or second reactor, are for example porous (e.g. mesh, felt, foam, cloth, paper) substrates associated with carbon, titanium, tungsten, stainless steel, nickel, or conducting oxides. Such porous support materials, which may also be referred to in the art as "gas diffusion electrodes", may appropriately contain 10 to 90%, more preferably 30 to 80% of voids, preferably allowing for fluid penetration, and in particular gas transfer. The porous support materials may for example be in the form of a mesh or felt. A mesh, a single layer of porous material, may show 10 to 80% of voids (open area), preferably 20-60% of voids. The surface area of the porous support material may appropriately be in the range of 10 to 1000 $cm^2$ per $cm^2$ geometrical area (for felts). The porous support materials may appropriately show a bulk layer thickness of 1 to 1000 microns, preferably 100 to 400 microns. In terms of photoelectrode thicknesses, at most 5 micrometres and preferably at most 1 micrometre is generally appropriate. On such porous support materials, (photo)cathode or (photo)anode materials selected in particular to promote electrocatalytic reactions, as will be described in more detail below, may be deposited. The thickness of the porous (photo)cathode or porous (photo)anode materials may be less than 5 microns, more preferably less than 1 micron, for example around 300 nm. Appropriate (co)catalyst materials may be provided as a layer preferably of thickness less than 200 nm, more preferably less than 50 nm. For (photo)cathode or (photo)anode materials, co-catalyst materials may provide a performance gain of as much as 100 times. The amount of added (photo)electrode materials selected in particular to promote oxygen reduction or oxygen evolution and/or carbon dioxide evolution, may typically be 1% by mass or less as compared to the mass of the porous support materials, for example in the form of a mesh, felt or foam, and the amount of added (co)catalyst material(s) will typically be less than that of the added materials.

In the device of the present disclosure, there may be an electrically conducting wire between the (photo)anode and (photo)cathode of the first and/or second reactor. This means that the (photo)anode and (photo)cathode of either reactor would not necessary need to be close to one another—the (photo)cathode could be in a different chamber provided it has an electrical connection. Most appropriately, the (photo)anode and (photo)cathode are connected through an electrical contact between them, such as a wire. Electricity generated can be used for a lamp or forced convention in advantageous functioning of the device of the disclosure.

BRIEF DESCRIPTION OF THE FIGURES

In FIG. 5, the light is shining from the (photo)anode side. In the case that there would only be a photocathode (with anode), it would preferable to shine the light from the opposite side.

DETAILED DESCRIPTION OF THE DISCLOSURE

The present disclosure relates to a device that comprises two membrane reactors connected with each other. The reactors can be placed in various configurations, for example but not restricted to, side-by-side or one on top of the other, if the first reactor is sufficiently transparent.

Among advantages one or more of which may be observed with respect to known carbon dioxide capture devices, the present disclosure may be seen as providing;
1) an easy-to-implement, stand-alone device; and/or
2) a new method for separation of $O_2$ and $CO_2$ by converting $O_2$ to $H_2O$ (gas to liquid).

The present disclosure provides a new mechanism to transfer the $CO_2$ from the sorbent to the collector via continuous oxygen reduction/oxidation cycles. (Photo)electrochemical $CO_2$ sorption has been so far restricted to ionic liquids and redox mediators are generally expensive, exotic materials. The present disclosure provides a mechanism for a simple, solid-state device design which captures $CO_2$ and produces electricity simultaneously—incentivizing its use. Additionally, a photoelectrochemical method to separate $O_2$/$CO_2$ by converting the $O_2$ to $H_2O$ is proposed. The present disclosure envisages:

i. Utilisation of oxygen reduction and oxygen evolution reaction cycles to create a bias free current as a way to drive $HCO_3^-$ ions through the anion exchange membrane.
ii. Utilisation of water to push $H^+$ ions through the proton exchange membrane.
iii. The use of solar energy to power the reaction with parallel production of electricity in the same device (but the disclosure could also be powered or supported by an external power source).

The function of the first reactor is to remove the $CO_2$ from the atmosphere—this can be ideally directly from the ambient air or alternatively from a concentrated solution such as $KHCO_3$. In effect, in this alternative embodiment, efforts to capture $CO_2$ in liquid solutions e.g. via $KOH \rightarrow KHCO_3$ conversion, may be combined with the system integrated in the present disclosure in order to subtract $CO_2$ from $KHCO_3$ and concentrate in particular at the side of the fluid outlet of the photoanode of the first reactor (117).

Figure 1:
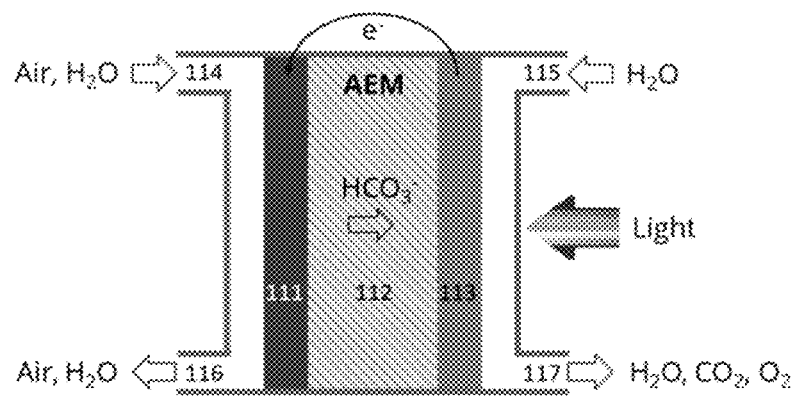
FIG. 1 shows a schematic diagram of carbon dioxide ($CO_2$) concentration by the first reactor of the carbon dioxide capture device of the present disclosure, comprising a (photo)cathode able to carry out the oxygen reduction reaction (ORR) and a photoanode able to carry out the oxygen evolution reaction (OER)/carbon dioxide evolution reaction ($CO_2ER$). The symbol "$h^+$" here refers to a positive hole, absorbing electrons.
Figure 1:
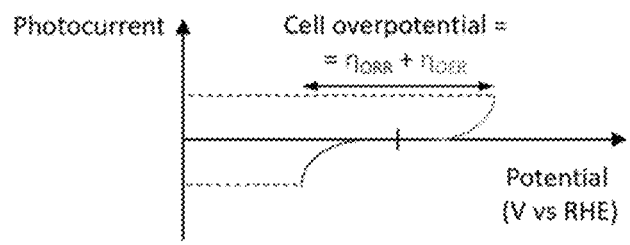

The first reactor comprises an anion exchange membrane placed between a porous (photo)anode and porous (photo)cathode. The (photo)anode contains or is connected (physically or electrically) to oxygen evolution and/or carbon dioxide evolution catalyst(s), whilst the (photo)cathode contains or is connected to an oxygen reduction catalyst. This may create a bias free current, where a photocurrent is generated only by light irradiation and applied potential bias is not needed. In order to generate a photocurrent efficiently from a photoelectrode, both solar light as well as an applied potential bias may be required across the photoelectrode. The main function of this is to improve charge separation between $e^-$ and $h^+$. However, applying a potential adds an additional degree of complexity. In an advantageous embodiment of the present disclosure, the photocurrent may be generated only under light irradiation i.e. applied potential bias is not needed. The anion exchange membrane absorbs $CO_2$ from the atmosphere through natural or forced convection to form $HCO_3^-$ ions. Forced convection may for example be carried out by using fans or a pump to force/circulate air through the device. The device can operate without the forced convection, but this is a possible embodiment to speed up the $CO_2$ sorption inside the anion exchange membrane. Under solar irradiation, the $HCO_3^-$ ions are forced to the other side of the device, i.e. the OER and $CO_2ER$ fluid outlet of the photoanode of the first reactor (117), under the bias free current. The collection step may appropriately be carried out primarily during the night, but collection is also possible in parallel with the transfer step under sunlight irradiation (FIG. 1). The mixture gathered on the opposite side is a mixture of $CO_2$ and $O_2$, but preferably a higher concentration of $CO_2$. The total overpotential losses for performing oxygen evolution and oxygen reduction are around 0.7 V, giving a wide variety of materials with a suitable band-gap to be potential photoelectrodes (FIG. 2).

Figure 2:
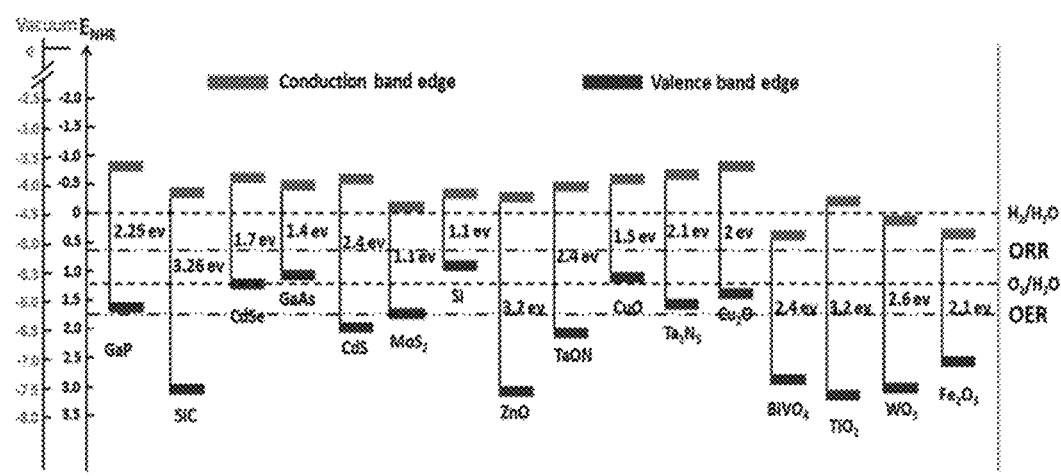
FIG. 2 shows the band-gap of various semiconductors with potential for oxygen evolution and reduction indicated with dotted, long lines, based on the reference Nanoscale Horiz., 2016, 1, 243-267.

In the present disclosure, appropriate materials for the porous (photo)anode (113, 213, 313, 413) of the first reactor (1) containing an anion exchange membrane (AEM) (112, 212, 312, 412) are n-type or p-type (photo)electrode materials compatible with AEM with a suitable band-gap (according to FIG. 2). Examples include $BiVO_4$, $TiO_2$, $WO_3$, which can be combined with a (photo)cathode to reach both $OER/CO_2ER$ and ORR potentials. $TiO_2$ is a practical example for device preparation, but the bandgap of $TiO_2$ is large, essentially restricting absorption to that of UV light. Materials with a smaller band-gap where the conduction band (CB) and valence band (VB) are on either side of the $OER/CO_2ER$ and ORR reaction potentials are advantageous. A smaller bandgap would enable higher absorption of visible light which allows considerably more energy to be used in practical applications. Materials with the band gap of around 1.0 to 2.0 eV and a conduction band edge lower than around 0.7 eV vs. NHE and valence band at higher than around 1.7 eV vs. NHE are appropriate, NHE (=Normal Hydrogen Electrode) here being a reference electrode and the potential of platinum in a 1 M acid solution (pH =0). Preferred materials for the porous (photo)anode of the first reactor (1) may be selected from the group consisting of: $BiVO_4$, $TaO_xN_y$, $LaTiO_2N$, $BaTaO_2N$, $SrTaO_2N$, $WO_3$, $CuWO_4$, $Fe_2O_3$, $ZnFe_2O_4$, $TiO_2$. A particularly preferred list consists of: $BiVO_4$, $TiO_2$, $WO_3$. Protective layers or cocatalysts (catalysts on photoelectrodes, the materials may be the same) may enhance performance and/or provide chemical compatibility to the alkaline environment. OER/CO$_2$ER (co)catalyst materials for the porous (photo)anode (113, 213, 313, 413) of the first reactor (1) may appropriately include catalysts based on one or more of: (A) OER: Ni, Ni Raney, NiCo, NiFe, NiP, CoP, CoPi, SrCoO$_3$, Ru, Mg, Ag, Au; (B) CO$_2$ER: Ni, Ni Raney, LaNiO$_3$, LaMnO$_3$, Ag, Ru, Au, Pt, Pt$_3$M where M=Ni, Co, Y, PtRu, Co, NiP, CoP, FeP, NiCo, NiMo, NiW (and their oxides for all metals in the list). For the CO$_2$ER, these materials can either be alone or supported, for example on carbon. Protection can be provided by overcoatings e.g. of TiO$_2$. Furthermore, in the case of the use of TiO$_2$ as materials for the porous photoanode, a co-catalyst is not necessary—the TiO$_2$ is self-catalysing.

In the present disclosure, appropriate materials for the porous (photo)anode (123, 223, 333, 423) of the second reactor (2) containing a proton exchange membrane (PEM) (122, 222, 322, 422) are similar, although not identical, to the materials described above for the porous (photo)anode of the first reactor. In effect, the different environment of the two reactors creates different potential stability issues, with the membrane of reactor 1 being alkaline, and the membrane of reactor 2 being acidic.

Preferred materials for the porous (photo)anode of the second reactor (2) may thus be selected from the group consisting of: BiVO$_4$, TaO$_x$N$_y$, LaTiO$_2$N, BaTaO$_2$N, CuWO$_4$, WO$_3$, TiO$_2$. Protective layers or cocatalysts may enhance performance and/or provide chemical compatibility to the alkaline environment. OER catalysts may advantageously include: Ir, Mg, Ru, Rh and their oxides (such as IrOx, RhOx), Pt, Pd, Au. ORR catalysts may advantageously include: Ru, Au, Pt, Pt$_3$M where M=Ni or Co or Y, PtRu, NiP, CoP, FeP, NiCo, NiMo, NiW. These may be used alone or supported, for example on carbon. OER (co)catalyst materials for the porous (photo)anode (123, 223, 323, 423) of the second reactor (2) may preferably include catalysts based on: Ir, Mg, and/or Ru. Protection can be provided by overcoatings e.g. of TiO$_2$. Furthermore, in the case of the use of TiO$_2$, a co-catalyst is not necessary—the TiO$_2$ is self-catalysing.

In the present disclosure, appropriate materials for the porous (photo)cathode (111, 211, 311, 411) of the first reactor (1) containing an anion exchange membrane (AEM) (112, 212, 312, 412) are generally speaking p-type (photo) electrode materials compatible with alkaline exchange membranes with a suitable band-gap and edges (according to FIG. 2). Examples of cathode materials include: Pt/C, Pt-Ru/C, Au/C, Ni/C and Ni-felt, preferred among these being: Pt, Pt-Ru/C. Materials with the band gap of around 1.0 to 2.0 eV and a conduction band edge lower than around 0.7 eV vs. NHE and valence band at higher than around 1.7 eV vs. NHE are appropriate. Preferred materials for the porous (photo)cathode of the first reactor (1) may be selected from the group consisting of: Si, MoS$_2$, MoSe$_2$, WS$_2$, GaP, CdS, CdSe, ZnSe, CuNbO$_4$, PMPDI, InP, WSe$_2$, ZnFe$_2$O$_4$, CuNbO$_3$, PMPDI, Cu$_2$O, g-C$_3$N$_4$, CIGS, CIGSe, CaFeO$_2$, and/or CuFeO$_2$. Protective layers or cocatalysts may enhance performance. ORR (co)catalyst materials for the porous (photo)cathode (111, 211, 311, 411) of the first reactor (1) may appropriately include catalysts based on: Ni, Ni Raney, LaNiO$_3$, LaMnO$_3$, Ag, Ru, Au, Pt, Pt$_3$M where M=Ni, Co, Y, PtRu, Co, NiP, CoP, FeP, NiCo, NiMo, NiW, Ir, Mg, Ru, Pt, Rh, and/or RhOx. Protection and or providing chemical compatibility with the alkaline environment can be provided by overcoatings e.g. of TiO$_2$. Carbon is also a suitable cathode but requires the use of a catalyst such as platinum, Pt/C cathodes being typically 60:40 Pt:C by weight.

In the present disclosure, appropriate materials for the porous (photo)cathode (121, 221, 321, 421) of the second reactor (2) containing a proton exchange membrane (PEM) (122, 222, 322, 422) are similar, although not identical, to the materials described above for the porous (photo)cathode of the first reactor (1). Preferred materials for the porous (photo)cathode of the second reactor (2) may thus be selected from the group consisting of: Si, MoS$_2$, MoSe$_2$, WS$_2$, GaP, CdS, CdSe, ZnSe, CuNbO$_4$, PMPDI, InP, WSe$_2$, ZnFe$_2$O$_4$, CuNbO$_3$, PMPDI, Cu$_2$O, g-C$_3$N$_4$, CIGS, CIGSe, CaFeO$_2$, and CuFeO$_2$. Protective layers or cocatalysts may enhance performance. ORR (co)catalyst materials for the porous (photo)cathode (121, 221, 321, 421) of the second reactor (2) may appropriately include catalysts based on: Ru, Au, Pt, Pt$_3$M where M=Ni, Co, Y, PtRu, NiP, CoP, FeP, NiCo, NiMo, and/or NiW. Protection can be ensured by overcoatings e.g. of TiO$_2$. Carbon is also a suitable cathode but requires the use of a catalyst such as platinum, Pt/C cathodes being typically 60:40 Pt:C by weight.

In the present disclosure, the anion exchange membrane (AEM) (112, 212, 312, 412) for the first reactor can appropriately be: anion exchange membrane materials containing quaternary ammonium groups (such as those sold under the commercial names: Fumasep® FAA, A201, Orion® TM1, Durion®, Selemion®) or low density polyurethane with quaternary ammonium groups; anion exchange membrane materials containing imidazolium or polybenzimidazole groups (such as those sold under the commercial names: Aemion®, Sustainion®), or tri-or di-amine cross-linked quaternized polysulfones. Preferred anion exchange membrane materials are ones containing quaternary ammonium groups, low density polyurethane with quaternary ammonium groups, or anion exchange membrane containing imidazolium or polybenzimidazole groups. A particularly preferred choice is the use of anion exchange membranes based on materials with vinylbenzyl chloride and imidazolium groups (such as those sold under the commercial name: Sustainion®). Low-density polyethylene (LDPE) including grafted LDPE is another preferred embodiment of the anion exchange membrane (AEM) in the present disclosure.

The proton exchange membrane (PEM) (122, 222, 322, 422) for the second reactor is for example appropriately based on a polysulfonic acid material such as those sold commercially under the names Aquivion® and Nafion®. Other proton exchange membranes may be used. Generally speaking, materials for the proton exchange membrane that can be used to carry out the present disclosure may be perfluorocarbonsulfonic acid or polysulfonic acid polymers (such as those sold commercially under the names: Nafion®, Aquivion®, Fumapem®-F, Fumapem® SX Pemion®), polybenzimidazole membranes (notably for possible high temperature use) such as those sold commercially under the names: Celtec®, Fumapem® AM, Fumapem® ST, polyacrylic acids, and hydrocarbon membranes (such as those sold commercially under the names commercial names: Fumatech® ST, Fumatech® P, E). Preferred materials for the proton exchange membrane are: perfluorocarbonsulfonic acid or polysulfonic acid polymers, or polyacrylic acids, most preferred being perfluorocarbonsulfonic acid or polysulfonic acid polymers.

In the present disclosure, the porous (photo)anode and/or porous (photo)cathode of either the first or second reactor may be ionomer coated, which may help to increase CO$_2$ sorption capacity. The ionomers used for such a coating may notably include ionomer materials mentioned above for use as anion exchange membrane (AEM) or proton exchange membrane (PEM). In the first reactor, with AEM, the loading of ionomer coating is preferably at most 50 mg/cm², more preferably 0.5 to 10 mg/cm². In the second reactor, with PEM, the loading of ionomer coating is preferably at most 50 mg/cm², more preferably 0.5 to 10 mg/cm², still more preferably 1.0 to 5.0 mg/cm², for example about 3.0 mg/cm². The ionomer coating is not necessary to carry out the present disclosure, and an ionomer coating of the porous (photo)anode and/or porous (photo)cathode of, for example, the second reactor does not necessitate an ionomer coating of the porous (photo)anode and/or porous (photo)cathode of the other, for example the first reactor. Further, the ionomers do not need to be the same on the (photo)anode and (photo)cathode side of either the first or second reactor, but this option is envisaged for the practice of the disclosure.

The present disclosure provides what may be a fully solid-state device. Thus the hydrogen carbonate $HCO_3^-$ anion as shown in FIG. 1 may be generated in the absence of any liquid, with the cathode and anode inlets all gaseous. It may be noted here, that for most ion exchange membrane materials, like polysulfonic acid materials including those sold under the name Nafion®, the membrane itself is hygroscopic. Therefore there is in practice $H_2O$ inside of the membrane which allows the flow of $HCO_3^-$. However, there may be no fully "liquid" water, and the membrane still retains a plastic-like/polymer structure when it is hydrated. In appropriate field use of the device of the disclosure, the water for the hydration may come from ambient humidity. Additional liquid water may however be needed in very dry conditions (low relative humidity, deserts).

Figure 3:
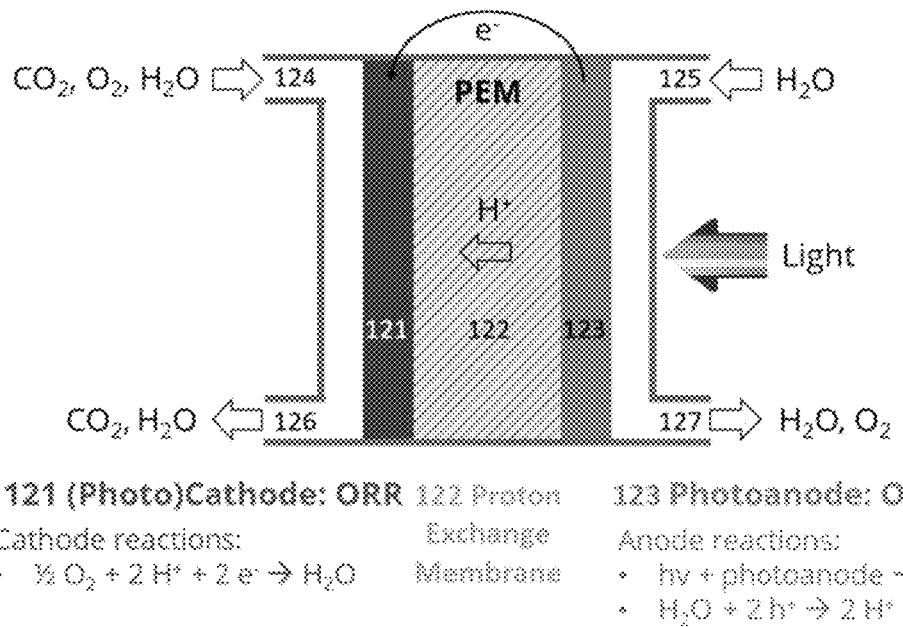
FIG. 3 shows a schematic diagram of carbon dioxide ($CO_2$) separation by the second reactor of the carbon dioxide capture device of the present disclosure, comprising a (photo)cathode able to carry out the oxygen reduction reaction (ORR) and a photoanode able to carry out the oxygen evolution reaction (OER).
Figure 3:
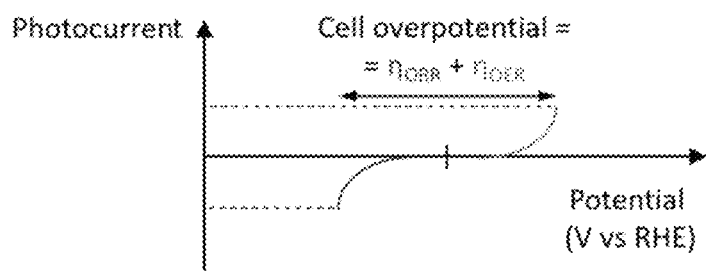

The function of the second reactor is to convert any remaining $O_2$ in the $CO_2/O_2$ mixture, which can be transferred to the second reactor via piping, into water to facilitate the purification of the $CO_2$ (separation of liquid and gas). The second reactor comprises a proton exchange membrane placed between a porous (photo)anode and porous (photo)cathode. The (photo)anode is connected (physically or electrically) to an oxygen evolution catalyst, whilst the (photo)cathode is connected to an oxygen reduction catalyst (FIG. 3). The $CO_2$/water mixture can be easily separated and can be stored/used for other applications.

There is potential for the capture and separation functions to be combined into one device, for example, the two configurations shown in FIG. 4.

Figure 4A:
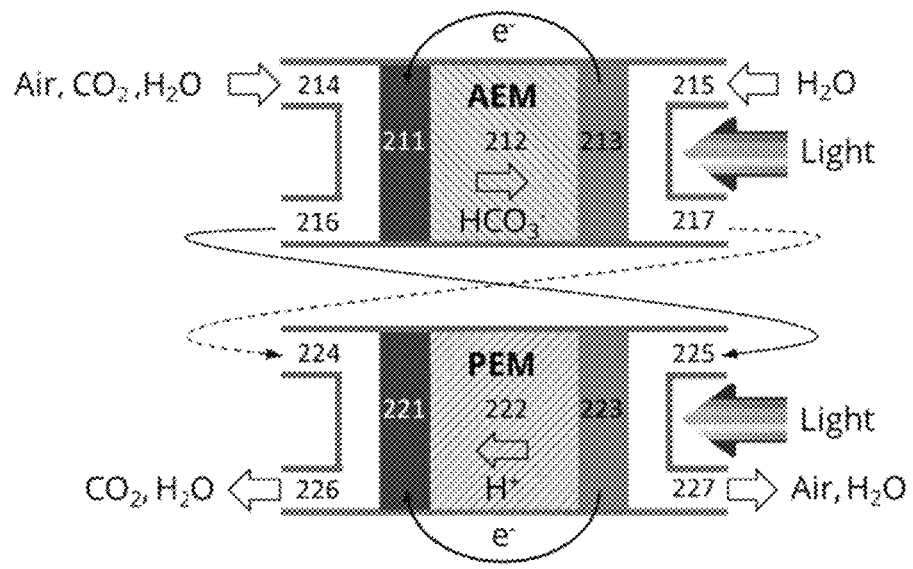
FIG. 4A shows combined device configurations wherein capture and separation functions are combined into one device, shown here in exemplary configuration as FIG. 4A.

Thus in a device for which an exemplary embodiment is illustrated in FIG. 4a, the present disclosure provides a carbon dioxide capture device wherein:

the porous (photo)cathode of the first reactor has a fluid inlet and a fluid outlet both able to carry carbon dioxide in air and water, and the porous (photo)anode of the first reactor has a fluid inlet and a fluid outlet both able to carry water and oxygen;

the porous (photo)cathode of the second reactor has a fluid inlet and a fluid outlet able both to carry carbon dioxide, oxygen and water, and the porous (photo)anode of the second reactor has a fluid inlet and a fluid outlet both able to carry water and oxygen, wherein the fluid outlet of the porous (photo)cathode of the first reactor is fluidically connected to the fluid inlet of the porous (photo)anode of the second reactor, and the fluid outlet of the porous (photo)anode of the first reactor is fluidically connected to the fluid inlet of the porous (photo) cathode of the second reactor.

Figure 4B:
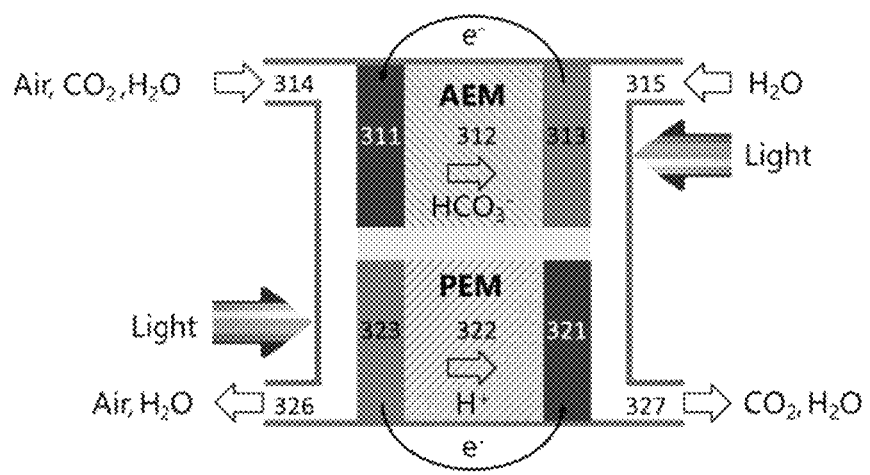
FIG. 4B shows combined device configurations wherein capture and separation functions are combined into one device, shown here in exemplary configuration as FIG. 4B.

Thus in a device for which an exemplary embodiment is illustrated in FIG. 4b, the present disclosure provides a carbon dioxide capture device wherein:

the first and second reactor are placed in a consolidated block separated by a separator such that the porous (photo) cathode of the first reactor is situated opposite the porous (photo)anode of the second reactor and separated therefrom by the separator, and the porous (photo)anode of the first reactor is opposite the porous (photo)cathode of the second reactor and separated therefrom by the separator, and a single fluid line including the fluid inlet of the porous(photo) cathode of the first reactor and the fluid outlet of the porous photoanode of the second reactor runs along one wall of the consolidated block, and a further single fluid line including the fluid inlet of the porous (photo)anode of the first reactor and the fluid outlet of the porous (photo)cathode of the second reactor runs along another wall of the consolidated block, the two walls facing one another and both being in contact with the separator.

The hashed border region in the middle of FIG. 4b is a frame/space to separate reactor 1 and 2 (first and second reactors). The essential function of the hashed border region is to avoid contact between the two reactors.

Example of Operation

Figure 5:
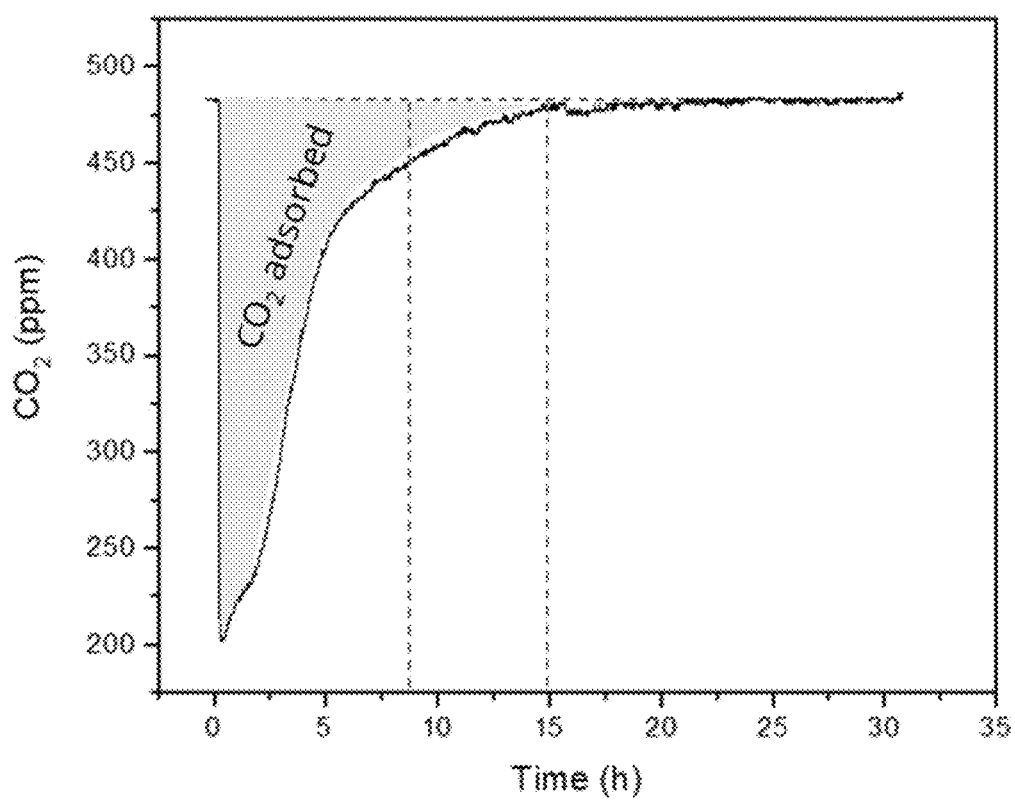
FIG. 5 shows carbon dioxide ($CO_2$) capture through absorption in the anion exchange membrane.

In an appropriate method for using the carbon dioxide capture device of the present disclosure, firstly, during the night, the anion exchange membrane is allowed to absorb $CO_2$. This type of membrane absorbs around 95% of its $CO_2$ capacity after 15 hours (FIG. 5), making it ideal for day—night cycling with the solar light.

Figure 6A:
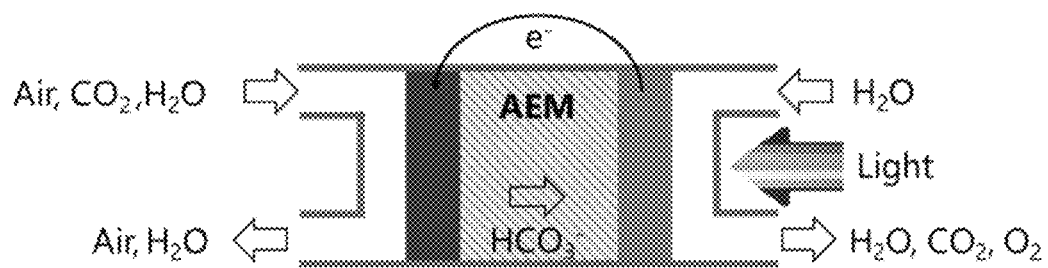
FIG. 6A shows the gases collected on the opposite side of the device, the part of the device concerned being shown in FIG. 6A.
Figure 6B:
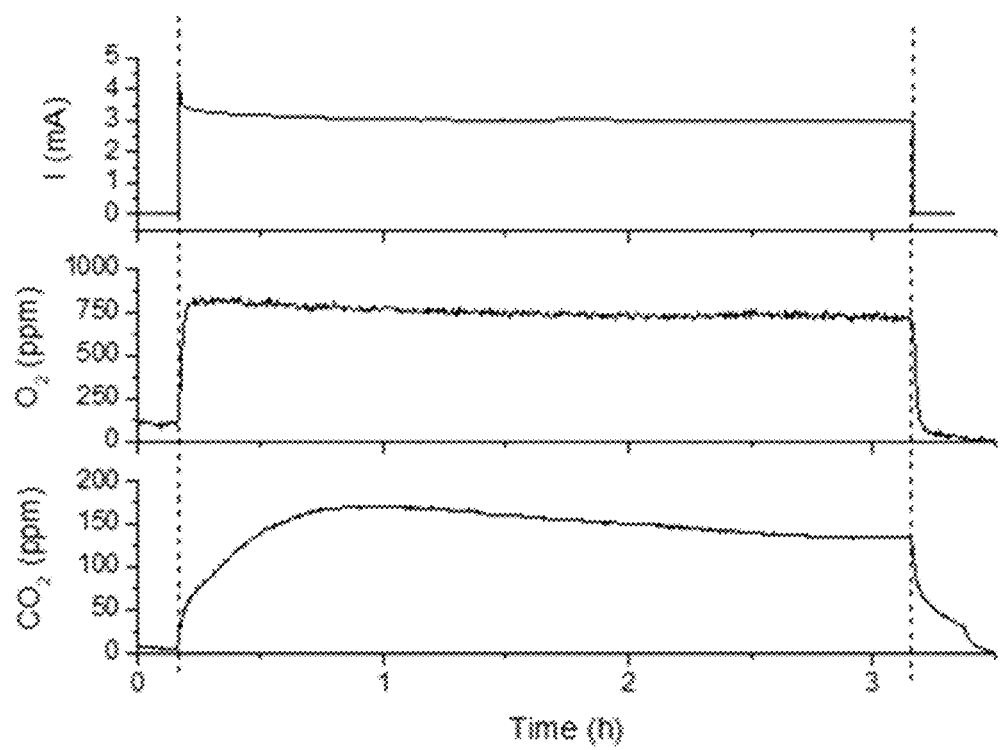
FIG. 6B shows the gases collected on the opposite side of the device, the results in FIG. 6B.
Figure 7A:
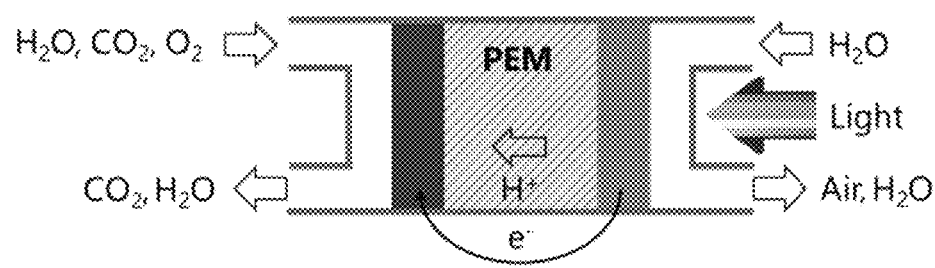
FIG. 7A shows experimental data of $CO_2$ separation using the concept of the disclosure, the part of the device concerned being shown in FIG. 7A.
Figure 7B:
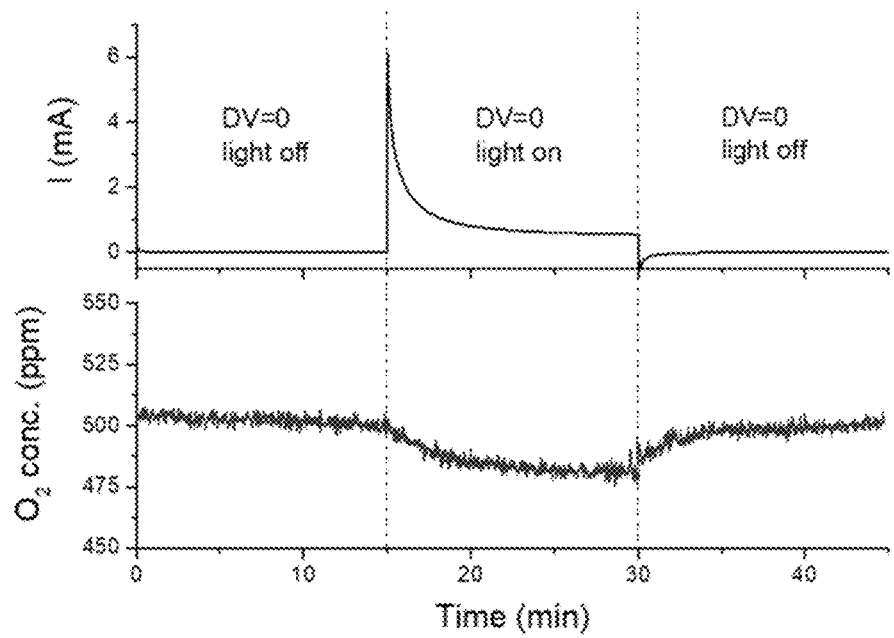
FIG. 7B shows experimental data of $CO_2$ separation using the concept of the disclosure, the results in FIG. 7B.
Figure 8:
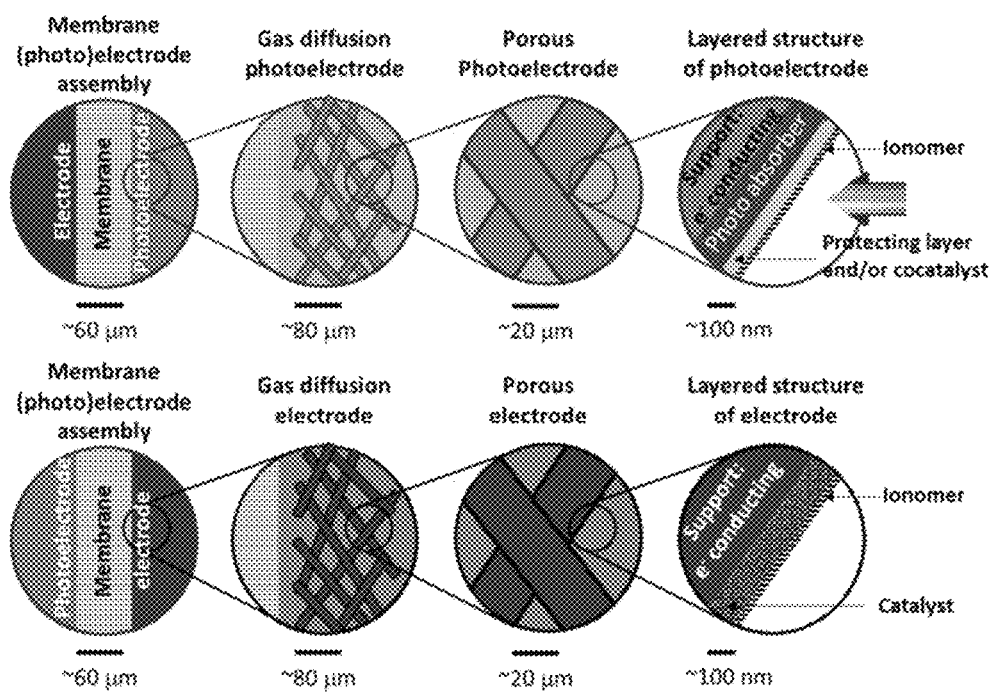
FIG. 8 shows possible device structure elements that can be used within the present disclosure.

The light irradiation is then begun to concentrate the $CO_2$. This generates charge (photocurrent—I (mA)—FIG. 6) which pushes the ions across the anion exchange membrane (FIG. 1). The gases collected on the opposite side of the first reactor (FIG. 6) are at a ratio of approx. 4:1 $O_2$:$CO_2$ (in comparison, ambient air is 2000:1 $O_2$:$CO_2$). As the gases collected, $CO_2$ is obtained in the fluid output, as shown at the bottom right of FIG. 1 as part of the gaseous mixture $H_2O$, $O_2$, and $CO_2$.

TABLE 1

|  | I (mA) | OER (ppm) | $CO_2$ER (ppm) | Selectivity to $CO_2$ |
|---|---|---|---|---|
| Experiment | 3 | 630 | 170 | 27% |
| Theory | 3 | 560 | 1120 | (35%) |

OER here is a reference to a type of reaction (oxygen evolution reaction) $CO_2$ER refers to the $CO_2$ evolution reaction. OER (ppm) refers to the levels of oxygen in the fluid outlet (117, 217) of the first reactor and $CO_2$ER (ppm) to the levels of $CO_2$ in in the fluid outlet (117, 217) side of the first reactor.

The carbon dioxide capture and separation in a ($OH^-$)-PEC cell was carried out here with:

Inlet-Cathode: 400 ppm $CO_2$+3% $H_2O$ in He;
Inlet-Anode: >3% $H_2O$ in He;
Electrolyte: Grafted LDPE anion exchange membrane. Here, LDPE is low-density polyethylene, and the "electrolyte" is the anion exchange membrane (AEM)
Photoanode: $TiO_2$/Ti-felt (substrate)
Cathode: Pt/C
UV lamp: 7 mW cm$^{-2}$ intensity
Pre-treatment in $CO_2$: overnight Here "(AEM)-PEC cell" refers to the first reactor, containing a anion exchange membrane. The PEC stands for "photoelectrochemical". The second reactor is the (PEM)-PEC cell, also containing an anion exchange membrane.

Different cathodes have been tested for the oxygen reduction reaction/$CO_2$ER. Pt/Ru, Au and Ni. Pt/Ru and Pt have given promising results and are considered among the preferred choices.

The next step is the conversion from $O_2$ to $H_2O$ through the proton exchange membrane, again through oxygen reduction and oxygen evolution cycling (FIG. 3). Again the reaction starts when light is shone on the device to generate charge carriers, which push the $H^+$ ions through the membrane. A clear drop in $O_2$ concentration can be seen when the light is on.

The oxygen purification in a PEM($H^+$)-PEC cell was carried out here with:
Inlet-Anode: 500 ppm $CO_2$+500 ppm $O_2$+3% $H_2O$ in He;
Inlet-Cathode: 2% $H_2O$;
Flow rate: 50 sccm (standard cubic centimetres per minute)
Electrolyte: Nafion® proton exchange membrane (PEM)
Photoanode: $TiO_2$/Ti-felt, ionomer coated Nafion®
Cathode: Pt/C
UV lamp: 7 mW $cm^{-2}$ The data shows a $CO_2$ signal which is stable and an $O_2$ signal decreased by 25 ppm which corresponds to around 65% faradaic efficiency.

SUMMARY OF REFERENCE NUMERALS

1: First reactor
111, 211, 311, 411: (Photo)cathode of first reactor
112, 212, 312, 412: Anion Exchange Membrane (AEM) of first reactor
113, 213, 313, 413: Photoanode of first reactor
114, 214, 314, 414: Fluid inlet of (photo)cathode of first reactor
115, 215, 315, 415: Fluid inlet of photoanode of first reactor
116, 216: Fluid outlet of (photo)cathode of first reactor
117, 217: Fluid outlet of photoanode of first reactor
2: Second reactor
121, 221, 321, 421: (Photo)cathode of second reactor
122, 222, 322, 422: Proton Exchange Membrane (PEM) of second reactor
123, 223, 323, 423: Photoanode of second reactor
124, 224: Fluid inlet of (photo)cathode of second reactor
125, 225: Fluid inlet of photoanode of second reactor
126, 226, 326, 426: Fluid outlet of (photo)cathode of second reactor
127, 227, 327, 427: Fluid outlet of photoanode of second reactor
330, 430: Separator for consolidated block assembly of first and second reactors

What is claimed is:

1. Carbon dioxide capture device comprising:
(A) a first reactor comprising an anion exchange membrane placed between a porous (photo)anode and porous (photo)cathode, wherein the (photo)anode contains or is connected physically or electrically to oxygen evolution and/or carbon dioxide evolution catalyst(s), and the (photo)cathode contains or is connected physically or electrically to an oxygen reduction catalyst;
(B) a second reactor comprising a proton exchange membrane placed between a porous (photo)anode and porous (photo)cathode, wherein the (photo)anode contains or is connected physically or electrically to an oxygen evolution catalyst, and the (photo)cathode contains or is connected physically or electrically to an oxygen reduction catalyst;
wherein the porous (photo)cathode of the first reactor has at least a fluid inlet able to carry carbon dioxide, air and water, and the porous (photo)anode of the first reactor has at least a fluid inlet able to carry water and oxygen,
the porous (photo)cathode of the second reactor has at least a fluid outlet able to carry carbon dioxide and water, and the porous (photo)anode of the second reactor has at least a fluid outlet able to carry water and oxygen,
wherein the carbon dioxide capture device is configured to transfer fluid exiting the porous (photo)cathode of the first reactor to the porous (photo)anode of the second reactor, and to transfer fluid exiting the porous (photo)anode of the first reactor to the porous (photo)cathode of the second reactor.

2. Carbon dioxide capture device according to claim 1, wherein:
the porous (photo)cathode of the first reactor has a fluid inlet and a fluid outlet both able to carry carbon dioxide in air and water, and the porous (photo)anode of the first reactor has a fluid inlet and a fluid outlet both able to carry water and oxygen;
the porous (photo)cathode of the second reactor has a fluid inlet and a fluid outlet able both to carry carbon dioxide, oxygen and water, and the porous (photo)anode of the second reactor has a fluid inlet and a fluid outlet both able to carry water and oxygen,
wherein the fluid outlet of the porous (photo)cathode of the first reactor is fluidically connected to the fluid inlet of the porous (photo)anode of the second reactor, and the fluid outlet of the porous (photo)anode of the first reactor is fluidically connected to the fluid inlet of the porous (photo)cathode of the second reactor.

3. Carbon dioxide capture device according to claim 1, wherein the first and second reactor are placed in a consolidated block separated by a separator such that the porous (photo)cathode of the first reactor is situated opposite the porous (photo)anode of the second reactor and separated therefrom by the separator, and the porous (photo)anode of the first reactor is opposite the porous (photo)cathode of the second reactor and separated therefrom by the separator, and a single fluid line including the fluid inlet of the porous (photo)cathode of the first reactor and the fluid outlet of the porous (photo)anode of the second reactor runs along one wall of the consolidated block, and a further single fluid line including the fluid inlet of the porous (photo)anode of the first reactor and the fluid outlet of the porous (photo)cathode of the second reactor runs along another wall of the consolidated block, the two walls facing one another and both being in contact with the separator.

4. Carbon dioxide capture device according to claim 1, wherein the porous (photo)anode of the first reactor comprises: $BiVO_4$, $TaO_xN_y$, $LaTiO_2N$, $BaTaO_2N$, $SrTaO_2N$, $WO_3$, $CuWO_4$, $Fe_2O_3$, $ZnFe_2O_4$, and/or $TiO_2$, and may further include (co)catalyst materials based on one or more of: Ni, Ni Raney, NiCo, NiFe, NiP, CoP, CoPi, $SrCoO_3$, Ru, Mg, Ag, Au, Fe-OOH, Ni-OOH, IrOx, CoOH, FeOx, Pt, Rh, RhOx, RuOx, and PtOx.

5. Carbon dioxide capture device according to claim 1, wherein the porous (photo)anode of the second reactor comprises: $BiVO_4$, $TaO_xN_y$, $LaTiO_2N$, $BaTaO_2N$, $CuWO_4$, $WO_3$, and/or $TiO_2$, and may further include (co)catalyst materials based on one or more of: Ir, IrOx, Rh, RhOx, Pt, PtOx, Ni, Co, CoOx, NiOx, MnOx, Co phosphate, Mg, Ru, Au, $Pt_3M$ where M=Ni or Co or Y, PtRu, NiP, CoP, FeP, NiCo, NiMo, and NiW.

6. Carbon dioxide capture device according to claim 1, wherein the porous (photo)cathode of the first reactor comprises one or more of: $MoS_2$, $MoSe_2$, $WS_2$, GaP, CdS, CdSe, ZnSe, $CuNbO_4$, PMPDI, InP, $WSe_2$, $ZnFe_2O_4$, $CuNbO_3$, PMPDI, $Cu_2O$, $g$-$C_3N_4$, CIGS, CIGSe, $CaFeO_2$, $CuFeO_2$, and may further include (co)catalyst materials based on one or more of: Ni, Ni Raney, $LaNiO_3$, $LaMnO_3$, Ag, Ru, Au, Pt, $Pt_3M$ where M=Ni or Co or Y, PtRu, Co, NiP, CoP, FeP, NiCo, NiMo, NiW, Ir, Mg, Ru, Pt, Rh, and RhOx.

7. Carbon dioxide capture device according to claim 1, wherein the porous (photo)cathode of the second reactor comprises one or more of: $MoS_2$, $MoSe_2$, $WS_2$, GaP, CdS, CdSe, ZnSe, $CuNbO_4$, PMPDI, InP, $WSe_2$, $ZnFe_2O_4$, $CuNbO_3$, PMPDI, $Cu_2O$, $g$-$C_3N_4$, CIGS, CIGSe, $CaFeO_2$, and $CuFeO_2$, and may further include (co)catalyst materials based on: Ru, Au, Pt, $Pt_3M$ where M=Ni, Co, Y, PtRu, NiP, CoP, FeP, NiCo, NiMo, and/or NiW.

8. Carbon dioxide capture device according to claim 1, wherein the porous (photo)anode of the first reactor and/or the porous (photo)anode of second reactor and/or the porous (photo)cathode of the first reactor and/or the porous (photo) cathode of second reactor, comprise(s) porous substrates, such as those in mesh, felt or foam form, the porous substrates comprising a material selected from the group consisting of: carbon; titanium; tungsten; stainless steel; nickel; and conducting oxides.

9. Carbon dioxide capture device according to claim 1, wherein the anion exchange membrane of the first reactor comprises a material selected from the group consisting of: materials containing quaternary ammonium groups; low density polyurethane with quaternary ammonium groups; materials containing imidazolium or polybenzimidazole groups; and tri-or di-amine cross-linked quaternized polysulfones.

10. Carbon dioxide capture device according to claim 9, wherein the anion exchange membrane of the first reactor comprises a material with vinylbenzyl chloride and imidazolium groups.

11. Carbon dioxide capture device according to claim 1, wherein the proton exchange membrane for the second reactor comprises a material selected from the group consisting of: perfluorocarbonsulfonic acid polymers; polysulfonic acid polymers; polybenzimidazoles; polyacrylic acids; and hydrocarbon membrane materials.

* * * * *